United States Patent [19]

Brambley

[11] Patent Number: 4,608,273
[45] Date of Patent: Aug. 26, 1986

[54] OPTICAL FIBRES

[75] Inventor: Roger J. Brambley, Great Dunmow, England

[73] Assignee: Standard Telephones and Cables Public Limited Company, London, England

[21] Appl. No.: 751,379

[22] Filed: Jul. 3, 1985

[30] Foreign Application Priority Data

Aug. 2, 1984 [GB] United Kingdom ............... 8419774

[51] Int. Cl.$^4$ ........................ B05D 3/06; B05D 3/02
[52] U.S. Cl. ................................ 427/54.1; 427/163; 427/256; 427/258; 427/266; 427/398.8; 427/407.3
[58] Field of Search ............. 427/54.1, 163, 258, 427/266, 256, 389.8, 407.3, 434.6, 434.7

[56] References Cited

U.S. PATENT DOCUMENTS

| | | | |
|---|---|---|---|
| 3,888,645 | 6/1975 | Marzocchi | 427/407.3 X |
| 4,211,591 | 7/1980 | Stiles | 427/163 |
| 4,264,649 | 4/1981 | Claypoole et al. | 427/163 |
| 4,277,272 | 7/1971 | Schneider | 427/266 X |
| 4,311,726 | 1/1982 | Hacker et al. | 427/54.1 |
| 4,488,773 | 12/1984 | Wagner | 427/163 X |
| 4,532,160 | 7/1985 | Vácha et al. | 427/434.7 X |

Primary Examiner—Thurman K. Page
Attorney, Agent, or Firm—Kerkam, Stowell, Kondracki & Clarke

[57] ABSTRACT

An optical fibre (1) is provided with a coating (2) which varies in thickness along its length, for use, for example, in optical fibre sensor systems, by applying layer of liquid coating material, and permitting surface tension to cause beading of the coating on the fibre before curing the coating material whereby to maintain the beaded structure.

6 Claims, 1 Drawing Figure

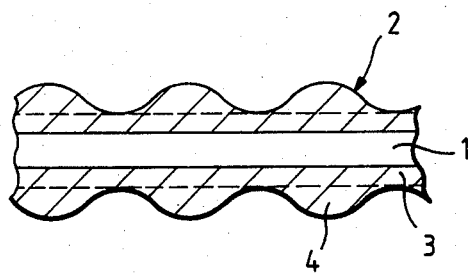

OPTICAL FIBRES

BACKGROUND OF THE INVENTION

This invention relates to optical fibres and in particular, but not exclusively, to optical fibres for sensor applications.

Optical fibres can become lossy when subject to deformations. In multimode fibres so-called microbending sensors can be constructed by applying a periodic (spatial) deformation (with a magnitude linked to the magnitude of the quantity being sensed) to the fibre. The optical loss is dependent on the period of deformation and has a sharp maximum. In monomode fibre a similar effect occurs, and in this case the deformation period for maximum loss depends on wavelength. The deformation of the optical fibre is generally obtained as a result of its being pressed, by the perturbation to be sensed, onto a machined grating or machined mandrel. Such sensor systems are disclosed in our U.K. Application No. 8222371 (Serial No. 2125572) (R. E. Epworth-V. A. Handerek 24-1) and No. 8405853 (Ser. No. 706,309) (R. E. Epworth-R. J. Brambley 26-1).

SUMMARY OF THE INVENTION

According to the present invention there is provided a method of providing an optical fibre with a coating which varies in thickness along the length of the fibre, including the step of applying a layer of a liquid coating material to the fibre, permitting the coating material to form into beads on the fibre and curing the coating material whereby to maintain the beaded structure.

BRIEF DESCRIPTION OF THE DRAWING

Embodiments of the invention will now be described with reference to the accompanying drawing which shows a cross-section through a coated optical fibre according to the present invention.

DESCRIPTION OF THE PREFERRED EMBODIMENTS

The optical fibres employed in the sensor system described in our above mentioned U.K. Application Nos. 8222371 and 8405853 have uniform coatings, that is the coating thickness is uniform along the length, and the deformation is applied by means of a mechanical grating with the appropriated period. However if the fibre is provided with a coating of periodically (spatial) varying thickness then the need for a mechanical grating is removed and the deformation of the fibre required for optical power coupling between modes may be achieved by pressing the fibre against a smooth surface.

The present values of surface tension and viscosity of the liquid coating materials used for optical fibre fabrication, and the conventional processing parameters, produce concentric coatings which do not modify their physical shape between being applied and being cured. Uniform concentric coatings can therefore be applied. However, if the time between application and curing is increased then surface tension forces can cause the formation of beads of coating material on the fibre core before curing. Thus by deliberately altering the processing parameters a non-uniform or beaded coating can be produced on an optical fibre core. Such a beaded coating is illustrated in the accompanying drawing. A fibre optic core 1, which may be mono or multimode, is provided with a beaded coating 2. In order that the fibre retains its initial strength there must be a predetermined minimum coating thickness. In order to ensure this a two stage coating process may be employed. In a first stage a uniform thickness layer 3 is applied and cured in a conventional manner. Subsequently a second layer is applied to the cured layer 3 whereby to result in a beaded layer 4 after curing.

If modified coating materials with higher surface tension/viscosity values than conventionally employed for uniform coatings were used, then the time between application and curing required to achieve the beaded coating would be reduced.

Typically the liquid coating material may be comprised of a thermally or UV light cured polymeric material which is applied by a conventional coating applicator. Using such conventional materials the production speed to produce beaded coatings is of the order of 5 meters per minute, compared with typical production speeds for uniform coatings of 30 to 100 meters per minute. However, since only relatively short lengths of such beaded coatings are required for sensor applications, of the order of 100 meters for example, high production speed requirements are not considered to be as critical as for uniform coatings on fibres for telecommunications purposes, for example. In a particular configuration a fourfold increase in dwell time or reduction in drawing speed has been found to allow formation of a beaded coating.

We claim:

1. A method of providing an optical fibre with a coating which varies in thickness along the length of the optical fibre, including steps of applying a first coating layer to the optical fibre, subsequently applying a layer of a liquid coating material to said first coating layer on the optical fibre, permitting the liquid coating material to form into beads on said first coating layer on the optical fibre and curing the coating material whereby to maintain the beaded structure, said first coating layer serving to ensure the presence of a minimum coating thickness on the optical fibre.

2. A method as claimed in claim 1, wherein said first coating layer is of a uniform thickness.

3. A method as claimed in claim 1, wherein said liquid coating material comprises a thermally cured polymeric material.

4. A method as claimed in claim 1, wherein the optical fibre is a single mode fibre.

5. A method as claimed in claim 1, wherein said liquid coating material comprises a UV light cured polymeric material.

6. A method as claimed in claim 1, wherein the optical fibre is a multimode fibre.

* * * * *